(12) United States Patent
Akami et al.

(10) Patent No.: US 6,619,806 B2
(45) Date of Patent: Sep. 16, 2003

(54) SHIELDING DEVICE

(75) Inventors: Noboru Akami, Chigasaki (JP); Takanori Shioda, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/863,293

(22) Filed: May 24, 2001

(65) Prior Publication Data

US 2001/0048557 A1 Dec. 6, 2001

(30) Foreign Application Priority Data

May 24, 2000 (JP) ........................... 2000-157973

(51) Int. Cl.⁷ .................................................. G02B 5/12
(52) U.S. Cl. ........................................ 359/513; 359/507
(58) Field of Search ................................. 359/507, 511, 359/512, 513

(56) References Cited

U.S. PATENT DOCUMENTS 6,024,457 A * 2/2000 Kawai et al. ............... 359/611

FOREIGN PATENT DOCUMENTS

| JP | A 6-222422 | 8/1994 |
| JP | A 11-305286 | 11/1999 |

* cited by examiner

Primary Examiner—Mark A. Robinson
Assistant Examiner—Alessandro Amari
(74) Attorney, Agent, or Firm—Oliff & Berridge PLC

(57) ABSTRACT

A shielding device for shielding a clearance between a frame member having an opening and a tube member received in the opening and movable substantially in the direction of an optical axis. The shielding device comprises an annular shielding member arranged between the inner circumference of the opening of the frame member and the outer circumference of the tube member. The annular shielding member is so slidably fitted on the tube member that its inner circumference may contact with the outer circumference portion of the tube member, and is either given substantially the same color as that of the outer circumference surface of the tube member or made substantially transparent at least at its portion having contact with the tube member.

5 Claims, 5 Drawing Sheets

SHIELDING DEVICE

INCORPORATION BY REFERENCE

The disclosure of the following priority application is herein incorporated by reference:

Japanese Patent Application No. 2000-157973 filed May 24, 2000

BACKGROUND OF THE INVENTION

1. Field of the Invention

The present invention relates to a shielding device for shielding the clearance between members moving relative to each other and, more particularly, to a shielding device for shielding from an optical beam, as might otherwise enter an optical device through a clearance between the lens-barrel and the body thereof, or for blocking water droplets or dust, as might otherwise immigrate through that clearance.

2. Related Art

In the prior art, the shading devices for blocking out the light, as might otherwise enter through the clearance between the two relatively moving members such as the camera body and the lens-barrel, have been disclosed in Japanese Laid-Open Patent Applications No. 6-222422 and No. 11-305286, for example.

These shading devices are constructed to include an annular (doughnut-shaped) shading member fitted slidably on the outer circumference portion of the photographic lens-barrel, and an annular support member for supporting the shading member. The shading member is made smaller in its internal diameter than the external diameter of the photographic lens-barrel and is fitted on the outer circumference of the lens-barrel. With this construction, the outer circumference portion and the shading member contact snugly with each other.

The shading members in the aforementioned shading devices of the prior art are generally constituted of a sheet of black rubber or artificial leather for giving it a shading effect. In order to improve the shading effect, the internal diameter of the annular shielding member has to be made so small as to raise the contact pressure of the shielding member against the lens-barrel.

There is also known a shielding device that is given a function to prevent the looseness of the lens-barrel by fixing the outer circumference portion of an annular shading member on the camera main body or the lens-barrel thereof. In this shielding device, the contact pressure between the shielding member and the lens-barrel may rise or drop where an eccentricity occurs between the camera main body and the lens-barrel or between a plurality of lens-barrels.

In the recent years, many products are coated on the appearances of the photographic lens-barrels in not only the black color of the known art but also metallic colors so as to express a metallic character considering the design and the impression of high quality. It is no exaggeration that the coated surface of the lens-barrel of this kind is like the file because the metallic coating contains aluminum powder.

In the case of photographic lens-barrel described above, the shading member slides on the surface of the photographic lens-barrel and is scraped off as it moves in the extending direction of the photographic lens-barrel relative to the camera body so that the filings stick to foul the surface of the photographic lens-barrel. Especially the aforementioned rise in the contact pressure makes a major cause for the fouling and has to be avoided because it may deteriorate the product image.

When the contact pressure is locally lowered by the aforementioned eccentricity, on the other hand, the clearance between the shielding member and the lens-barrel is easily formed to invite a poor shielding. In this sense, there is a contrary restriction on the excessive drop of the contact pressure for preventing the aforementioned fouling.

SUMMARY OF THE INVENTION

An object of the present invention is to provide a shielding device that is freed from having its tube member fouled by the sliding motions of the shielding member.

Another object of the present invention is to provide a shielding device which can prevent the tube member from being fouled by the sliding motions of the shielding device and which can be shielded more reliably even if the tube member is made eccentric.

In order to achieve the above-specified objects, the shielding device according to the present invention shields a clearance between a frame member having an opening and a tube member where is received in the opening and movable in the direction of an optical axis. The shielding device comprises an annular shielding member arranged between the inner circumference of the opening of the frame member and the outer circumference of the tube member. The annular shielding member is so slidably fitted on the tube member that its inner circumference may contact with the outer circumference portion of the tube member. The annular shielding member is either given substantially the same color as that of the outer circumference surface of the tube member or made substantially transparent at least at its portion having contact with the tube member.

In case that the shielding member is fixed at its outer circumference portion in the frame member and its inner circumference portion to contact with the outer circumference portion of the tube member is fitted slidably on the tube member, a shading member may be deformable at least radially with respect to the tube member. It is preferable that the shielding member has a shading property at its portion having no contact with the tube member. The contact pressure of the shading member to contact with the tube member is lower than that of the shielding member to contact with the tube member.

When the invention is applied to the camera, the frame member is a camera body, and the tube member is a lens-barrel.

The shielding member may include a low-friction layer having contact with the outer circumference portion of the tube member.

DETAILED DESCRIPTION OF THE PREFERRED EMBODIMENTS

The embodiment of a shielding device according to the present invention will be described in detail with reference to FIGS. 1 to 3.

Figure 1:
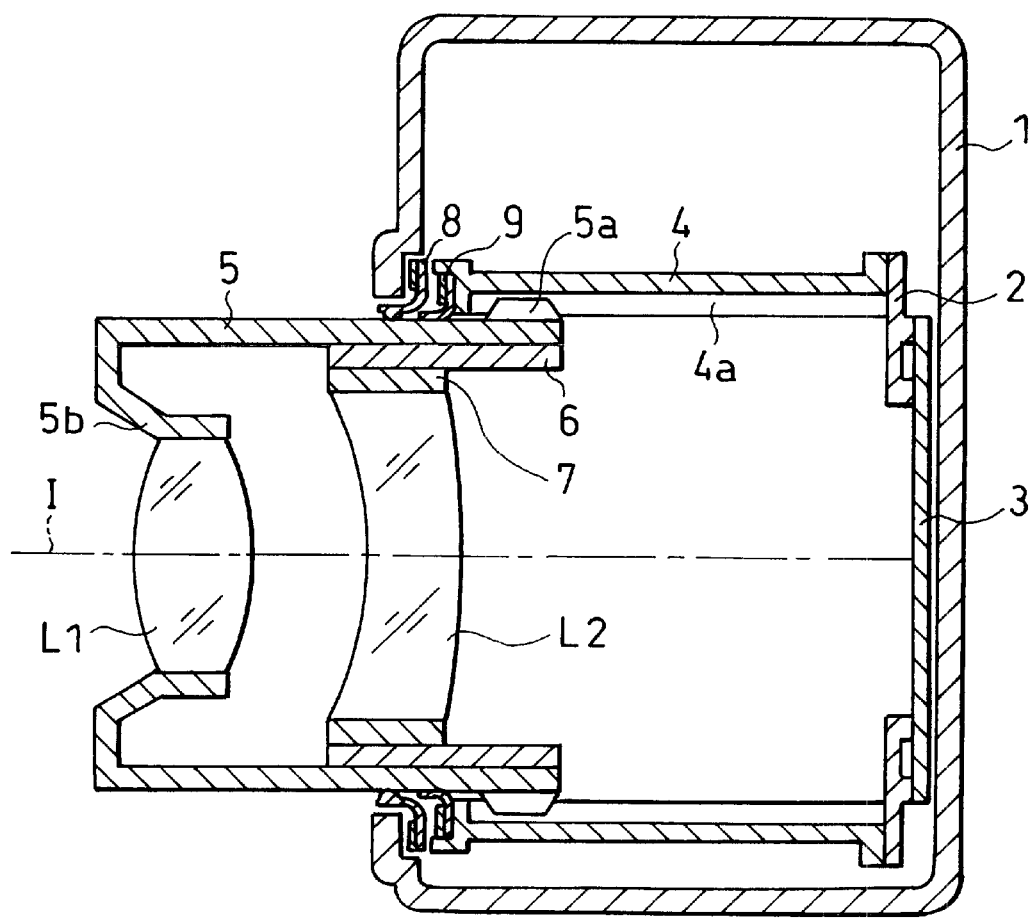
FIG. 1 is a sectional view of a camera equipped with a shielding device according to one embodiment of the present invention.
Figure 2:
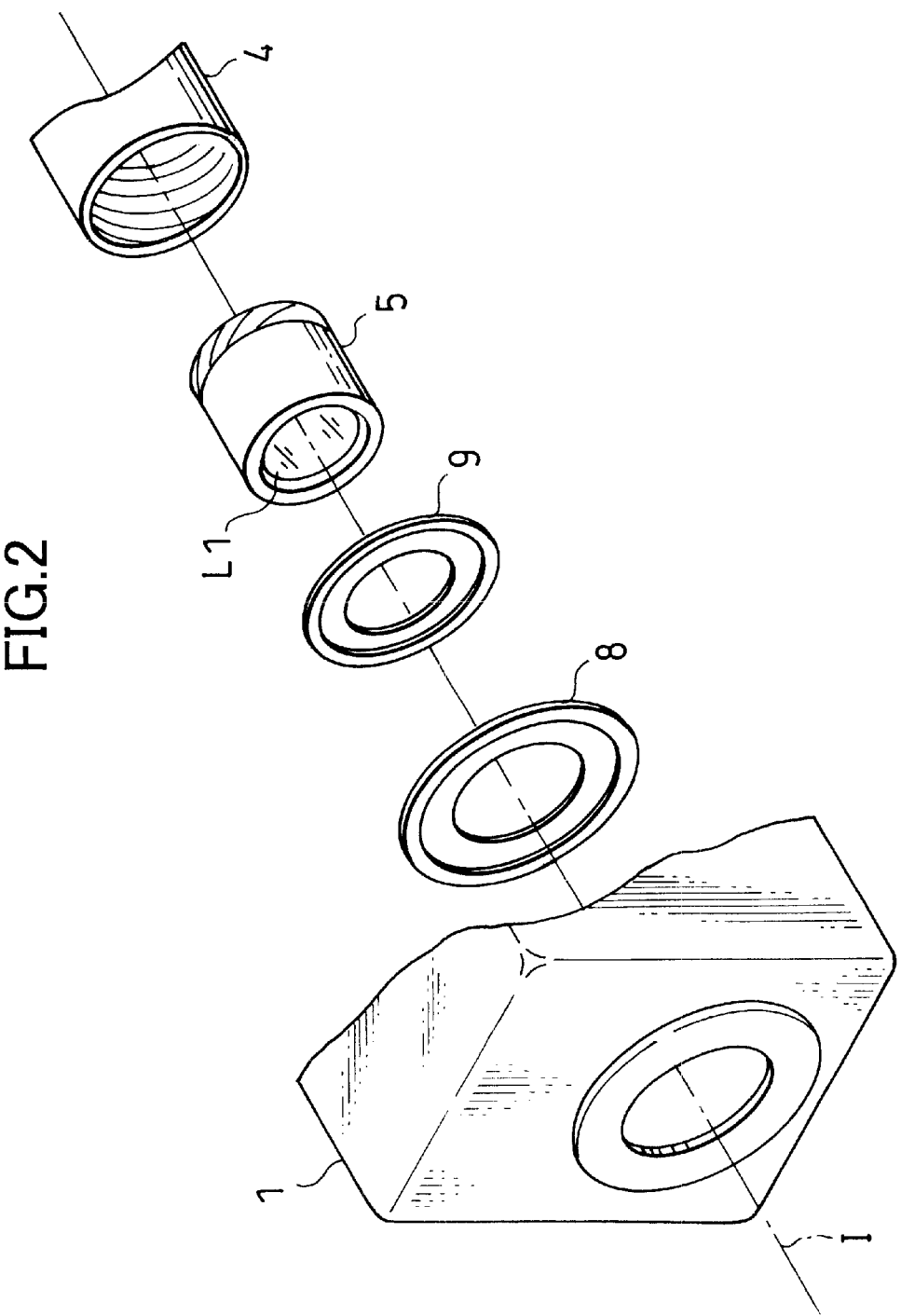
FIG. 2 is an exploded perspective view showing a construction of a major portion including the shielding device of the camera shown in FIG. 1.
Figure 3:
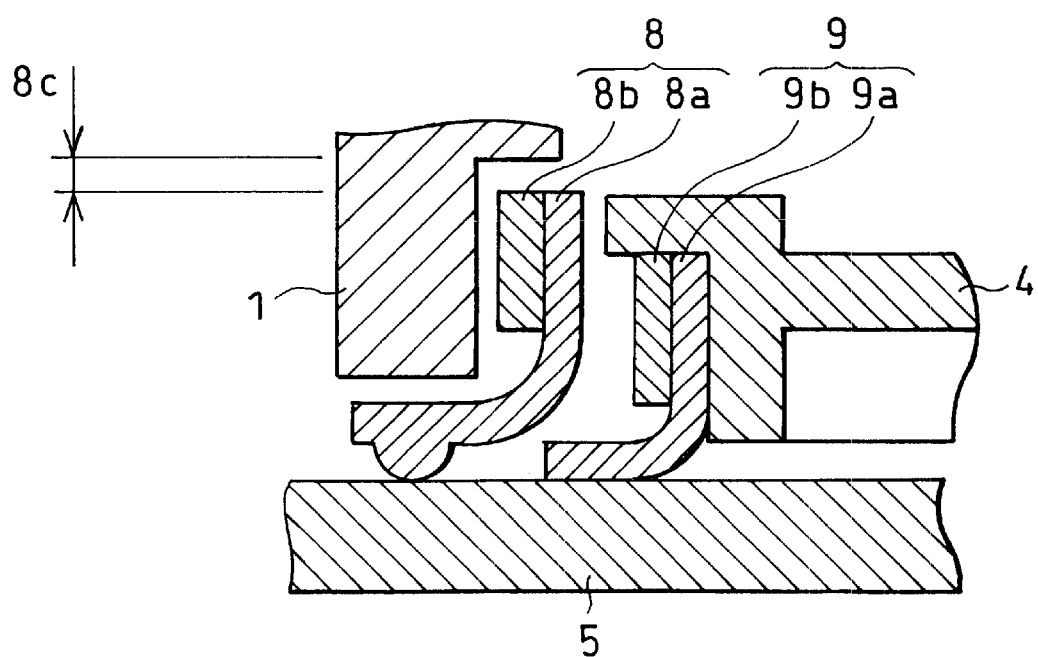
FIG. 3 is an enlarged view showing the shielding device of the camera shown in FIG. 1.

In FIGS. 1 to 3, a cover 1 (a camera body) presenting the appearance of a camera covers a main body 2 for fixing the various mechanisms not shown. Numeral 3 designates a film pressure plate and forms a clearance for passing the not-shown film between itself and the main body 2.

A photographic optical system is constructed of a first lens group L1 and a second lens group L2, which are made individually movable along an optical axis direction I to change the focal distance.

A lens-barrel, as equipped with the photographic optical system, is composed of a stationary tube 4, a movable tube 5, a cam tube 6 and a lens chamber 7, of which the major components excepting the stationary tube 4 are so arranged that they can move back and forth along the optical axis direction I with respect to the opening of the cover 1. The stationary tube 4 of the lens-barrel is fixed in the main body 2 and has a female helicoid 4a formed in its inner circumference. The movable tube 5 is threaded at its male helicoid 5a into the female helicoid 4a of the stationary tube 4 so that it can move back and forth in the optical axis I by turning itself. The first lens group L1 is held in an inner tube portion 5b of the movable tube 5 and the second lens group L2 is held in a lens chamber 7. The cam tube 6 is fixed in the inner circumference portion of the movable tube 5 so that it moves the second lens group L2 along the optical axis I as it turns together with the movable tube 5. Here, both the mechanism for driving the movable tube 5 and the mechanism for moving the second lens group L2 are known in the art, and their detailed description will be omitted.

Between the opening of the cover 1 and the movable tube 5, there is interposed the shielding device for shielding the light or dust, as might otherwise immigrate through their clearance. This shielding device is constructed to include a shading portion 8 (a shading member) for especially blocking out the light and a supporting portion 9 (a shielding member) for preventing the movable tube 5 from getting loose.

The shading portion 8 is composed of an elastic member 8a of an annular (doughnut) shape having an effect for shielding the light and constituted of an extendible material such as rubber, and an annular core member 8b fixed by adhering to the elastic member 8a for retaining the rigidity of the outer circumference portion of the elastic member 8a. The internal diameter of the elastic member 8a is set smaller than the external diameter of the movable tube 5 so that the elastic member 8a may adhere, when fitted to the movable tube 5, snugly to the outer circumference of the movable tube 5, as shown in FIG. 3, to block the entrance of the light. Moreover, a clearance 8c is left between the outer circumference of the shading portion 8 and the internal step portion of the cover 1.

On the other hand, the supporting portion 9 is composed of an annular elastic member 9a constituted of a material, such as rubber, having no color (or substantially the same color as that of a coating applied to the surface of the movable tube 5) with elasticity, and an annular core member 9b fixed by adhering to the elastic member 9a for retaining the rigidity of the outer circumference portion of the elastic member 9a.

The internal diameter of the elastic member 9a is also set smaller than the external diameter of the movable tube 5 so that the elastic member 9a may adhere snugly to the outer circumference of the movable tube 5, when it is fitted to the movable tube 5, as shown in FIG. 3. As a result, it is possible to construct such a supporting portion of the lens-barrel as can realize a close contact with the movable tube 5 and a fouling resistance.

Figure 4:
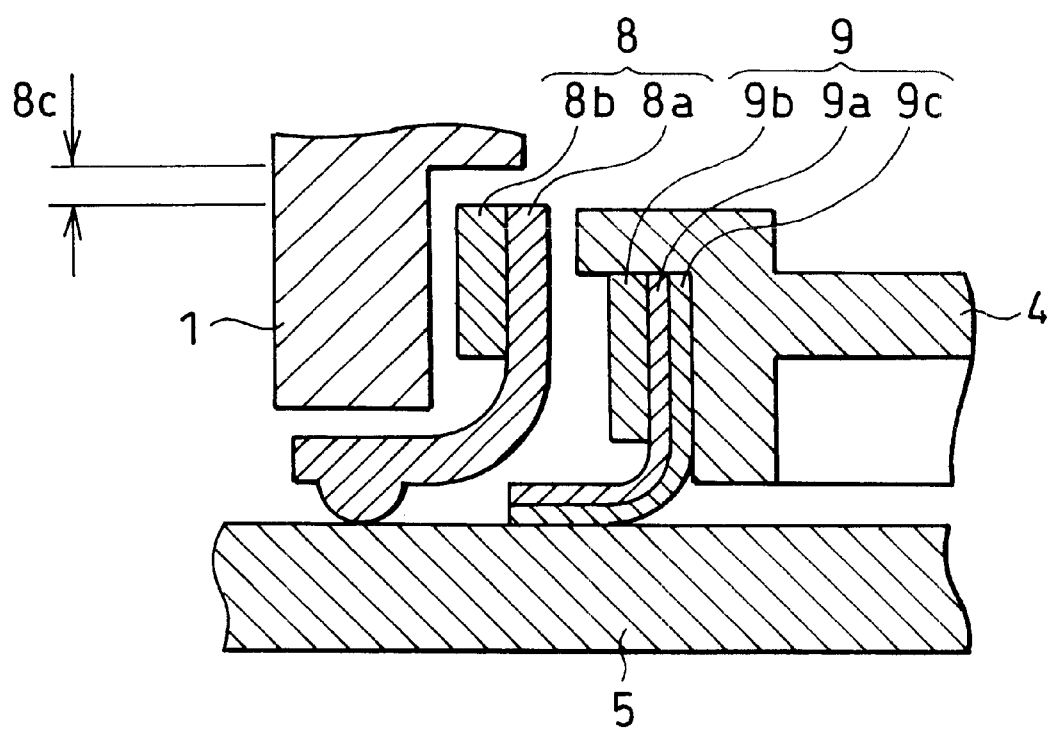
FIG. 4 is a view showing one modification of the shielding device of the camera.

Here, the supporting portion 9 may also be composed, as shown in FIG. 4, of an annular elastic member 9a constituted of a material such as rubber, having an elasticity and a property for shading a light, a low-friction layer 9c constituted of Teflon or the like, formed on one face of the elastic member 9a and having an excellent sliding property, and an annular core member 9b fixed by adhering to the elastic member 9a for retaining the rigidity of the outer circumference portion of the elastic member 9a. The low-friction layer 9c may be given no color or substantially the same color as that of a coating applied to the surface of the movable tube 5.

In the supporting portion 9 shown in FIG. 4, too, the internal diameter of the elastic member 9a and the low-friction layer 9c is made smaller than the external diameter of the movable tube 5 so that the elastic member 9a adheres, when fitted to the movable tube 5, snugly to the outer circumference of the movable tube 5, as shown in FIG. 4. Moreover, the low-friction layer 9c is constituted of Teflon or the like having a low sliding resistance to smoothen the motions of the lens-barrel. In the case of this modification, in addition to the close contact with the movable tube and the fouling resistance as described above, it is possible to realize the sliding property by the low-friction layer 9c and the shading property by the elastic member 9a. Especially, the supporting portion 9 is equipped with the elastic member 9a having the shading property 9a so that even the light can be shielded if it leaks through the clearance between the cover 1 and the shading portion 8.

Here, the movable tube 5 for holding the first lens group L1 and the second lens group L2 should be neither inclined nor made eccentric no matter where the movable tube 5 might move along the direction of the optical axis, so that the movable tube 5 may fulfill its optical performance sufficiently. The movable tube 5 is supported at its one end such that its male helicoid 5a is threaded into the female helicoid 4a of the stationary tube 4. On the other end side, the movable tube 5 is supported by the supporting portion 9 that is fixed by adhering to the leading end portion of the stationary tube 4. As a result, the movable tube 5 is hardly inclined or made eccentric at any position where it moves.

On the other hand, the shading portion 8 is interposed between the inner face of the cover 1 and the supporting portion 9 in the direction of the optical axis I, as shown in FIG. 3. And in the direction perpendicular to the optical axis I direction, the shading portion 8 is fitted on the movable tube 5 while leaving the clearance 8c between the outer circumference of the supporting portion 9 and the inner wall face of the cover 1, but is not fixed. Even if the movable tube 5 should be temporarily eccentric with respect to the stationary tube 4, the shading portion 8 can be fit on the surface of the movable tube 5 tightly by being deformed. Therefore, it is possible to prevent reliably from establishing the clearance between the surface of the movable tube 5 and the shading portion 8, through which the light leaks.

Where the outer face of the movable tube 5 is coated in such as a silver metallic color for giving a high-grade appearance, the powder of aluminum contained in the coating will scrape the elastic member 9a, as shown in FIG. 3 (or the low-friction layer 9c, as shown in FIG. 4), of the supporting portion 9. According to the shielding device of the invention, however, the elastic member 9a of FIG. 3 or the low-friction layer 9c of FIG. 4 is colorless or the color such as gray which is similar to the coating color so that it hardly appears dirty even if scraped to foul the surface of the movable tube 5.

Further, where the movable tube 5 has the silver-metallic coating color, the color of the elastic member 9a or the low-friction layer 9c may be whitened according to the brightness of the coating color. Where the movable tube 5 is coated in a metallic color such as champagne gold, on the other hand, the color of the elastic member 9a or the low-friction layer 9c may be thin brown. By thus determining the color of the material of the elastic member 9a or the low-friction layer 9c according to the coating color, it is possible to make the appearance less dirty.

On the other hand, the elastic member 8a of the shading portion 8 contacts with the movable tube 5, but it is not necessary for the shading portion to be fitted to the movable tube 5 by a force as strong as that of the supporting portion 9, as long as the shading portion can block the immigration of the light. Therefore, it is hardly probable that the elastic member 8a of the shading portion 8 is scraped by the aluminum powder on the coating surface.

Figure 5:
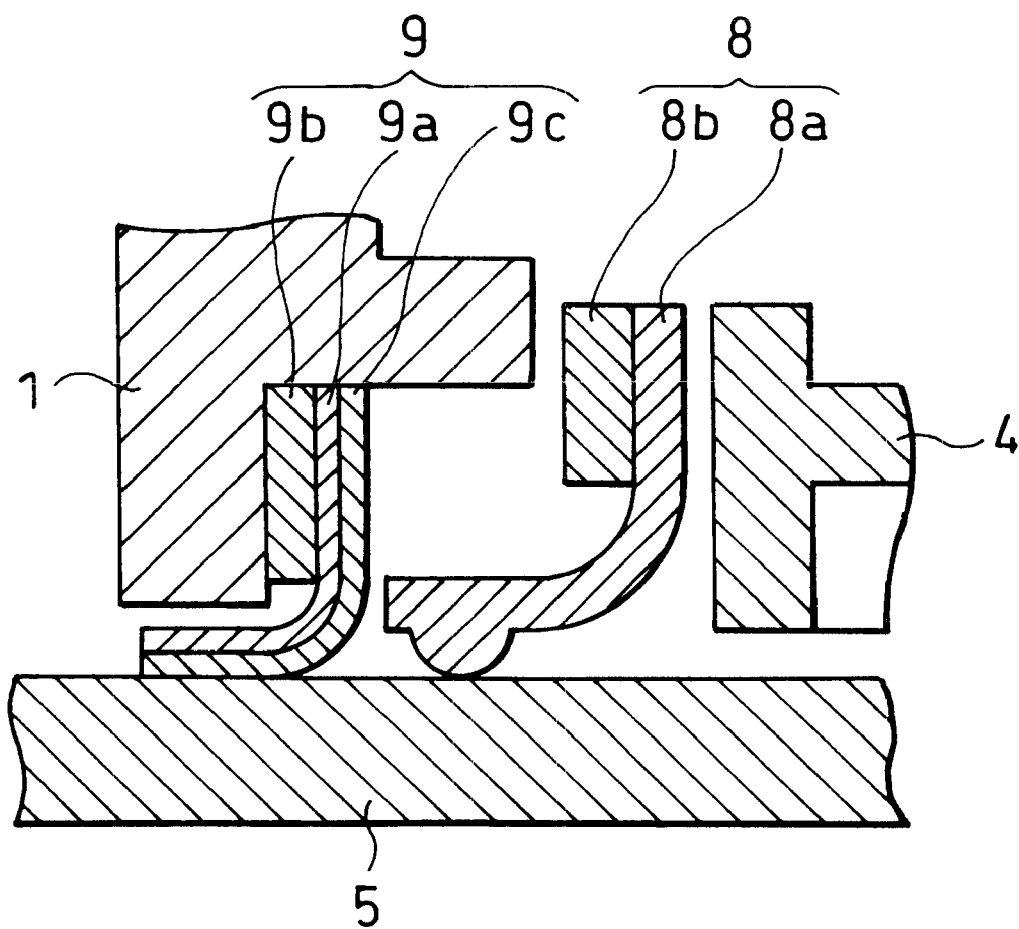
FIG. 5 is a view showing another modification of the shielding device of the camera.

Here will be described another modification of the shielding device of the present invention with reference to FIG. 5. The members for performing similar functions will be designated by the reference numerals common to those of FIGS. 1 to 4, and their detailed description will be omitted.

The foregoing embodiments are constructed such that the movable tube 5 is held by the supporting portion 9 fixed on the leading end of the stationary tube 4. However, the shielding device shown in FIG. 5 is different in that the supporting portion 9 is fixed by adhering to the inner wall face of the cover 1, and in that the shading portion 8 is arranged in the space between the cover 1 and the leading end portion of the stationary tube 4. As in the embodiment shown in FIG. 4, the elastic member 9a of the supporting portion 9 is constituted of a material having the shading effect and is equipped with the low-friction layer 9c having no color or a color substantially identical to that of the surface coating of the movable tube 5.

According to this construction, the supporting portion 9 can block most of the optical beam, as might otherwise immigrate through the clearance between the cover 1 and the movable tube 5, so that even a little light, if having leaked, can be substantially completely shielded by the shading portion 8. According to this construction, on the other hand, the optical beam having immigrated without being shielded by the supporting portion 9 (especially its low-friction layer 9c) is restricted in its direction and quantity, so that the force (the contact pressure) for the shading portion 8 to fasten the movable tube 5 can be weakened. As compared with the shielding device shown in FIGS. 3 and 4, moreover, the distance between the fulcrums for the movable tube 5 can be made longer than that of the shielding device shown in FIGS. 3 and 4, to reduce the looseness and the eccentricity of the movable tube 5 more effectively. If the contact pressure of the supporting portion 9 is made higher, on the other hand, there is obtained another effect that the scraped chips are hard to emigrate to the outside of the cover 1.

As has been described hereinbefore, according to the present invention, the shielding device as arranged between the frame member and the tube member and fitted on the tube member, is made transparent or given substantially the same color as that of the outer circumference surface of the tube member at its portion in contact with the tube member. In addition to the acquisition of the intrinsic effect to shield the dust or the like, therefore, the surface of the tube member can be effectively prevented from being fouled, even where the shielding device is scraped to stick to the surface of the tube member by the surface roughness due to the metallic powder contained in the coating on the tube member surface.

According to another feature of the present invention, on the other hand, the shielding member is fixed at its outer circumference portion on the frame member, and the shielding device is further equipped with the shading member which is fitted slidably on the outer circumference portion of the tube member and movable, in the other word, deformable at least radially with respect to the tube member, so that the tube member can be less loosened and made less eccentric by the shielding member. Even if the tube member should get eccentric, the clearance between the shading member and the tube member can be hardly established so that the optical leakage can be prevented effectively.

According to still another feature of the present invention, the shielding member has the property for shading the light at its portion having no contact with the tube member so that it can have the effect of shielding from not only the dust or the like but also the light.

According to a further feature of the present invention, the frame member is a camera body, and the tube member is a lens-barrel. Therefore, it is possible to construct the camera which can suppress the eccentricity of the lens-barrel effectively while extremely lowering the possibility of the optical leakage.

What is claimed is:

1. A shielding device that shields a clearance between a frame member having an opening and a tube member which is received in said opening and movable substantially in a direction of an optical axis, comprising:

an annular shielding member arranged between an inner circumference of the opening of said frame member and an outer circumference of said tube member, and a shading member fitted slidably on said tube member so that an inner circumference portion of said shading member contacts with the outer circumference portion of said tube member, and deformable at least radially with respect to said tube member, wherein:

said annular shielding member is slidably fitted on said tube member so that an inner circumference of said annular shielding member contacts with an outer circumference portion of said tube member, said shielding member is either given substantially a same color as a color of a surface of the outer circumference of said tube member or made substantially transparent at least at a portion of the shielding member that contacts with said tube member, said shielding member is fixed at an outer circumference portion of said shielding member in said frame member, and a contact pressure of said shading member to contact with said tube member is lower than a contact pressure of said shielding number to contact with said tube member.

2. The shielding device according to claim 1 wherein:

said frame member is a camera body, and said tube member is a lens-barrel.

3. A shielding device according to claim 1, wherein:

said shielding member includes a low-friction layer that contacts with the outer circumference portion of said tube member.

4. A shielding device that shields a clearance between a frame member having an opening and a tube member which is received in said opening and movable substantially in a direction of an optical axis, comprising:

an annular shielding member arranged between an inner circumference of the opening of said frame member and an outer circumference of said tube member, said annular shielding member being slidably fitted on said tube member so that an inner circumference of said annular shielding member contacts with an outer circumference portion of said tube member, and a shading member fitted slidably on said tube member so that an inner circumference portion of said shading member contacts with the outer circumference portion of said tube member, said shading member being deformable at least radially with respect to said tube member, wherein:

said shielding member is fixed at an outer circumference portion of said shielding member in said frame member, said shielding member has a shading property at a portion of said shielding member that does not contact with said tube member, and a contact pressure of said shading member to contact with said tube member is lower than a contact pressure of said shielding member to contact with said tube member.

5. A shielding device according to claim 4, wherein:

said shielding member is either given substantially a same color as a color of a surface of the outer circumference of said tube member or made substantially transparent at least at a portion of the shielding member that contacts with said tube member.

* * * * *